United States Patent
Kume et al.

(10) Patent No.: US 9,994,128 B2
(45) Date of Patent: Jun. 12, 2018

(54) SEAT SLIDING DEVICE FOR VEHICLE

(71) Applicant: AISIN SEIKI KABUSHIKI KAISHA, Kariya-shi (JP)

(72) Inventors: Sho Kume, Kariya (JP); Naoaki Hoshihara, Kariya (JP); Hideki Fujisawa, Chiryu (JP)

(73) Assignee: AISIN SEIKI KABUSHIKI KAISHA, Kariya-shi (JP)

( * ) Notice: Subject to any disclaimer, the term of this patent is extended or adjusted under 35 U.S.C. 154(b) by 0 days. days.

(21) Appl. No.: 15/546,552

(22) PCT Filed: Mar. 23, 2016

(86) PCT No.: PCT/JP2016/059078
§ 371 (c)(1),
(2) Date: Jul. 26, 2017

(87) PCT Pub. No.: WO2016/158591
PCT Pub. Date: Oct. 6, 2016

(65) Prior Publication Data
US 2018/0001791 A1    Jan. 4, 2018

(30) Foreign Application Priority Data

Mar. 31, 2015   (JP) .................................. 2015-071064
Nov. 6, 2015    (JP) .................................. 2015-218960

(51) Int. Cl.
*F16M 13/00*    (2006.01)
*B60N 2/07*     (2006.01)

(52) U.S. Cl.
CPC .................................. *B60N 2/0722* (2013.01)

(58) Field of Classification Search
USPC ......................................................... 248/429
See application file for complete search history.

(56) References Cited

U.S. PATENT DOCUMENTS 9,145,069 B2 *   9/2015  Yamada ................... B60N 2/07
9,156,376 B2 *  10/2015  Yamada ................... B60N 2/08
(Continued)

FOREIGN PATENT DOCUMENTS

JP      11-346859 A      12/1999
JP    2010-221936 A      10/2010
(Continued)

OTHER PUBLICATIONS

International Search Report dated Jun. 21, 2016 in PCT/JP2016/059078 filed Mar. 23, 2016.
(Continued)

*Primary Examiner* — Monica E Millner
(74) *Attorney, Agent, or Firm* — Oblon, McClelland, Maier & Neustadt, L.L.P.

(57) ABSTRACT

A seat sliding apparatus for a vehicle includes a lower rail, an upper rail supported to be movable relative to the lower rail, and a pressing member attached to one of the lower rail and the upper rail via a biasing member. The pressing member constantly presses the other of the lower rail and the upper rail by a biasing force of the biasing member. The lower rail and the upper rail extend in a first direction. The pressing member obliquely presses the other of the lower rail and the upper rail so that force components are generated in both the first direction and in a second direction orthogonal to the first direction.

4 Claims, 6 Drawing Sheets

(56) References Cited

U.S. PATENT DOCUMENTS

| 9,227,528 | B2* | 1/2016 | Yamada | ............... | B60N 2/0843 |
| 2014/0353454 | A1* | 12/2014 | Yamada | ............... | B60N 2/0705 |
| | | | | | 248/430 |

FOREIGN PATENT DOCUMENTS

| JP | 4945168 B2 | 6/2012 |
| JP | 5463707 B2 | 4/2014 |

OTHER PUBLICATIONS

English translation of the International Preliminary Report on Patentability and Written Opinion of the International Searching Authority dated Oct. 3, 2017 in PCT/JP2016/059078 filed Mar. 23, 2016.

* cited by examiner

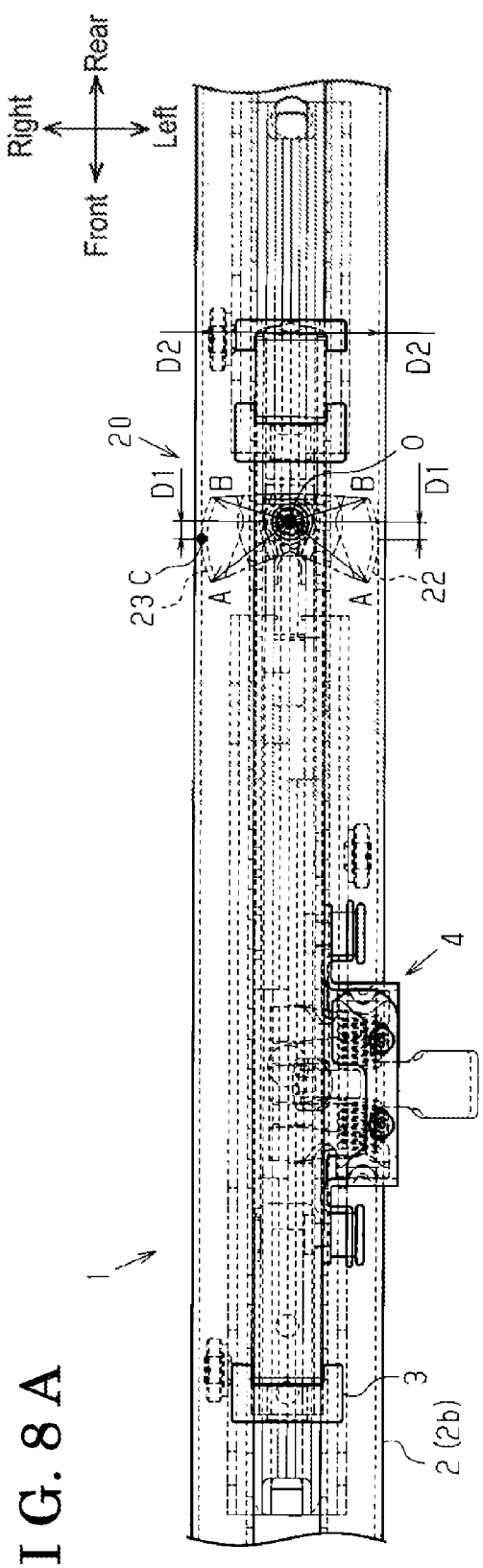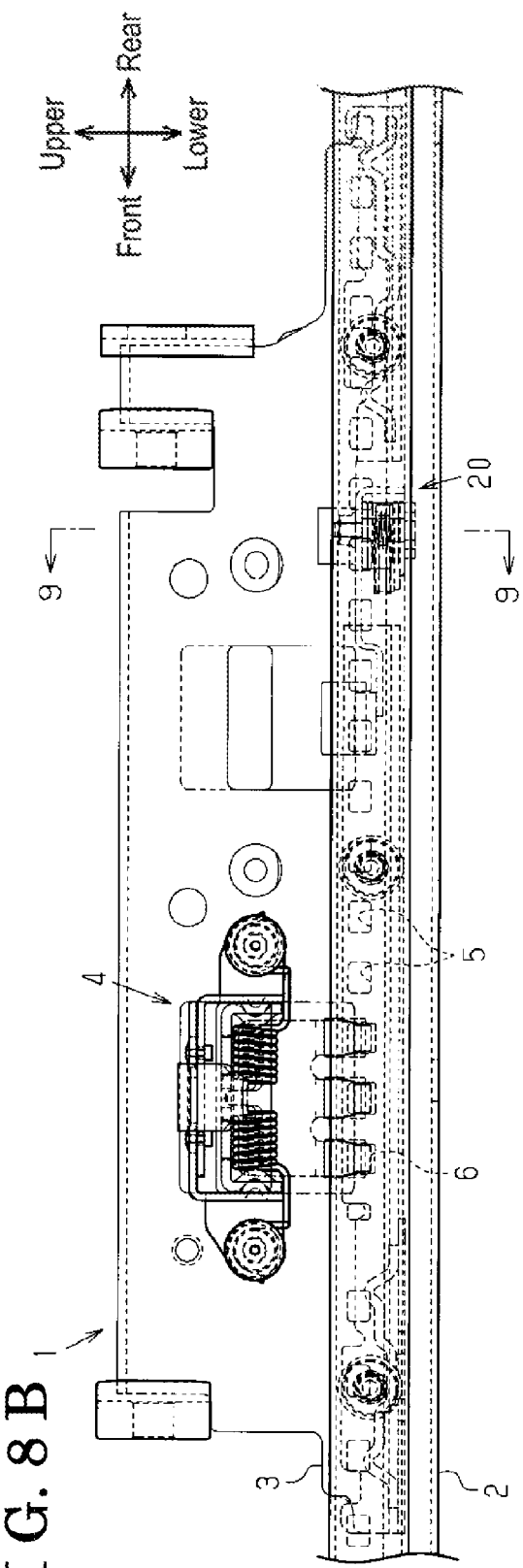

F I G. 9
F I G. 10
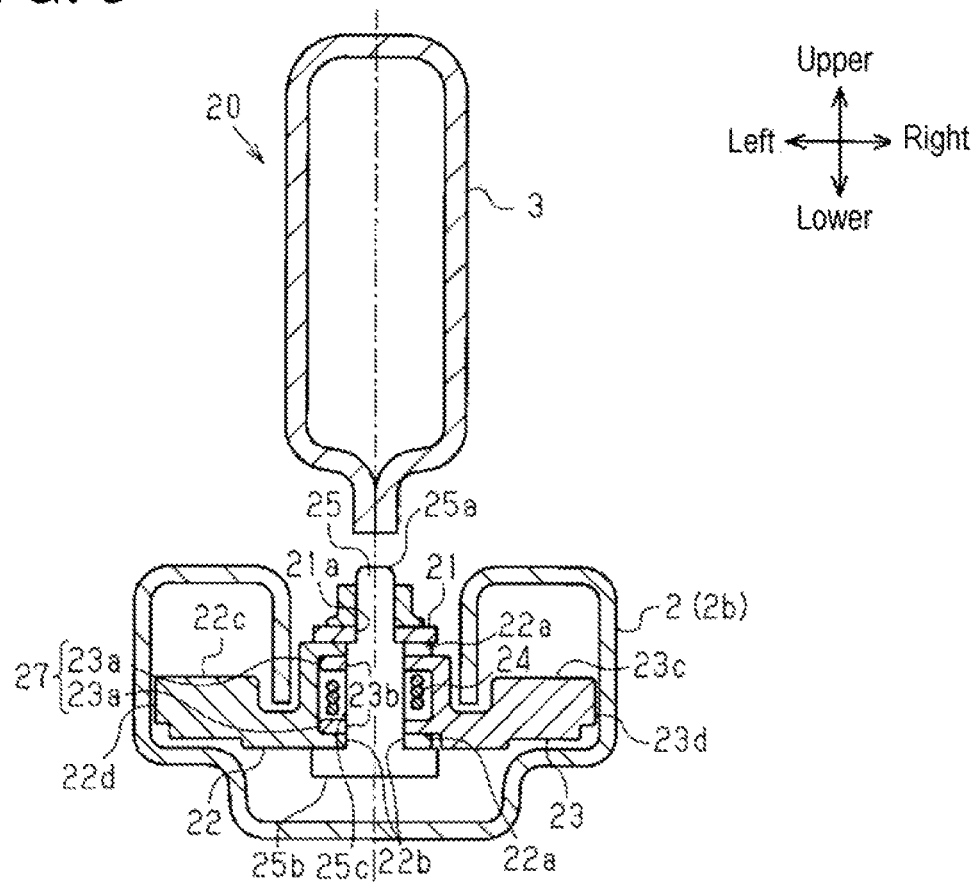
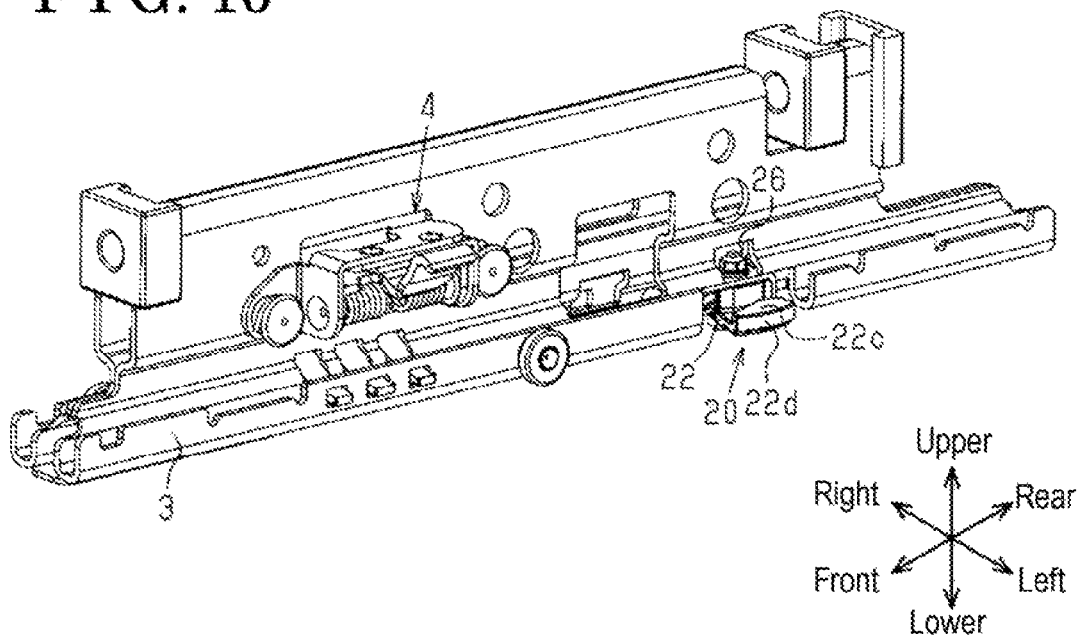

SEAT SLIDING DEVICE FOR VEHICLE

TECHNICAL FIELD

The present invention relates a seat sliding apparatus for a vehicle.

BACKGROUND ART

Conventionally, a lower rail of a seat sliding apparatus applied to a rear seat of a vehicle including three-row seats is configured in a manner that a front portion is lower than a rear portion. On the other hand, a lower rail of a front seat including a driver's seat is configured in a manner that a rear portion is lower than a front portion. At a seat which includes such an inclined lower rail, a load for operating the seat forward which is required in a case where a seat position is adjusted forward and a load for operating the seat rearward which is required in a case where the seat position is adjusted rearward are different from each other.

A seat sliding apparatus for a vehicle of Patent document 1 includes a sliding resistance adjustment mechanism. The sliding resistance adjustment mechanism includes plural protrusions provided at a lower rail, and a ball attached to an upper rail via a spring that elastically compresses. The protrusion includes an inclined surface and a resistance surface. The inclined surface is provided at a rear side of the protrusion in an upward direction of the seat, and the resistance surface is provided at a front side of the protrusion in the upward direction of the seat. The resistance surface includes a steeper inclination than the inclined surface. When a sliding operation is performed, the ball rides over the protrusion. When the ball rides over the protrusion, an angle of a surface with which the ball is in contact, that is, a resistance that the ball receives from the surface, differs depending on a direction in which the seat is slide-operated. By using the relationship, a load required in the sliding operation in the upward direction of the seat and a load required in the sliding operation in the downward direction of the seat can be set to be equal to each other.

DOCUMENT OF PRIOR ART

Patent Document

Patent document 1: JP4945168B

OVERVIEW OF INVENTION

Problem to be Solved by Invention

At the seat sliding apparatus for a vehicle of Patent document 1, at the moment when the ball rode over the protrusion, the resistance between the ball and the protrusion is eliminated. That is, the load needed for the sliding operation is not stable through the entire sliding operation, and accordingly it is difficult to make a fine positional adjustment.

An object of the present invention is to provide a seat sliding apparatus for a vehicle, the apparatus at which a positional adjustment is made easily.

Means for Solving Problem

To achieve the above-described object, a seat sliding apparatus for a vehicle according to an embodiment of the present invention includes a lower rail, an upper rail supported to be movable relative to the lower rail, a pressing member attached to one of the lower rail and the upper rail via a biasing member. The pressing member always presses the other of the lower rail and the upper rail with the use of a biasing force of the biasing member. The lower rail and the upper rail are extended in a first direction. The pressing member presses the other of the lower rail and the upper rail obliquely such that component forces are generated both in the first direction and a second direction that is orthogonal to the first direction.

According to this configuration, a pressing direction of the pressing member is inclined or tilted relative to the rail, thereby generating a difference in load when the upper rail moves relative to the lower rail. In addition, the contact of the pressing member and the rail with each other is always maintained by the biasing member, and thus the above-described load always acts when a seat position is adjusted. Consequently, the load needed to adjust the seat position is stabilized, and therefore the seat position is easily adjusted.

There is no need to provide the plural protrusions like the known art, and therefore this configuration is manufactured with less workload compared to the known case. It is ideal that the biasing member corresponds to a spiral spring. The pressing member corresponds to a rotational member rotated by the biasing force of the spiral spring. The spiral spring and the rotational member are attached, in a state where axial centers coincide with each other, to one of the lower rail and the upper rail.

According to this configuration, the identical axial center is used, thereby downsizing the seat slide for the vehicle. It is ideal that the lower rail is inclined in such a manner that one of a front portion and a rear portion of the lower rail is higher than the other. The pressing member is attached to the upper rail and presses the lower rail such that a component force along a downward direction of the lower rail is generated.

According to this configuration, a component of a gravity force along an extending direction of the lower rail which acts on the upper rail, and a difference between loads in the front direction and the rear direction of the upper rail are cancelled out or offset each other. Consequently, even though the lower rail is inclined, the load related to the adjustment of the seat position can be equalized regardless of a direction of the adjustment.

It is ideal that the pressing member is provided as a pair. The pressing members are positioned at respective sides in a right-and-left direction of the lower rail and the upper rail to be positioned at an equal distance from a center in the right-and-left direction, and the pressing members press the lower rail or the upper rail.

According to this configuration, the pressing members arranged as pair are positioned at the respective sides in the right-and-left direction of the lower rail and the upper rail to be positioned at the equal distance from the center in the right-and-left direction, and the pressing members press the lower rail or the upper rail. Consequently, pressing positions are increased, and a pressing force can be applied to the lower rail or the upper rail in a well-balanced manner.

It is ideal that the seat sliding apparatus for a vehicle further includes a fixing member for attaching the pair of pressing members to one of the lower rail and the upper rail, and a support member supporting the pressing members in such a manner that the pressing members are rotatable. The pair of pressing members are configured to use, in common, the single fixing member, the single support member and the single biasing member.

According to this configuration, each of the fixing member, the support member and the biasing member are used in common or shared by the pressing members arranged as the pair, thereby reducing the number of components. It is ideal that the pressing member includes an accommodation portion accommodating the biasing member.

According to this configuration, the biasing member is configured to be accommodated in the accommodation portion provided at the pressing member, thereby minimizing exposure of the biasing member.

Effect of Invention

According to a seat sliding apparatus for a vehicle of the present invention, a positional adjustment is made easily.

BRIEF DESCRIPTION OF DRAWINGS

FIG. 8A is an overall top view of a seat sliding apparatus of a second embodiment.

FIG. 8B is an overall side view of the seat sliding apparatus.

FIG. 9 is a cross-sectional view taken along line 9-9 of FIG. 8B illustrating the seat sliding apparatus of the second embodiment.

FIG. 10 is a perspective view of the seat sliding apparatus of the second embodiment.

MODE FOR CARRYING OUT THE INVENTION (First Embodiment) A first embodiment of a seat sliding apparatus for a vehicle will be described hereunder with reference to the drawings. As illustrated in FIG. 1A, a seat sliding apparatus 1 for a vehicle includes a lower rail 2 fixed to a vehicle floor portion, an upper rail 3 which can be displaced or moved relative to the lower rail 2, and a lock mechanism 4 attached to the upper rail 3. The lower rail 2 includes plural engagement holes 5 provided in a row arrangement in a long-side direction of the lower rail 2. The lock mechanism 4 includes engagement tabs 6 which are switched between a state in which the engagement tabs 6 engage with the engagement holes 5 (which will be hereinafter referred to as a lock state) and a state in which the engagement tabs 6 disengage from the engagement holes 5 (which will be hereinafter referred to as an unlock state), by an operation of a lever which is not shown. A relative displacement of the upper rail 3 relative to the lower rail 2 is restricted in a case where the lock mechanism 4 is in the lock state and the relative displacement of the upper rail 3 relative to the lower rail 2 is allowed in a case where the lock mechanism 4 is in the unlock state. A configuration and action of the lock mechanism 4 is a known technique, and therefore detailed explanations thereof are omitted.

Figure 1A:
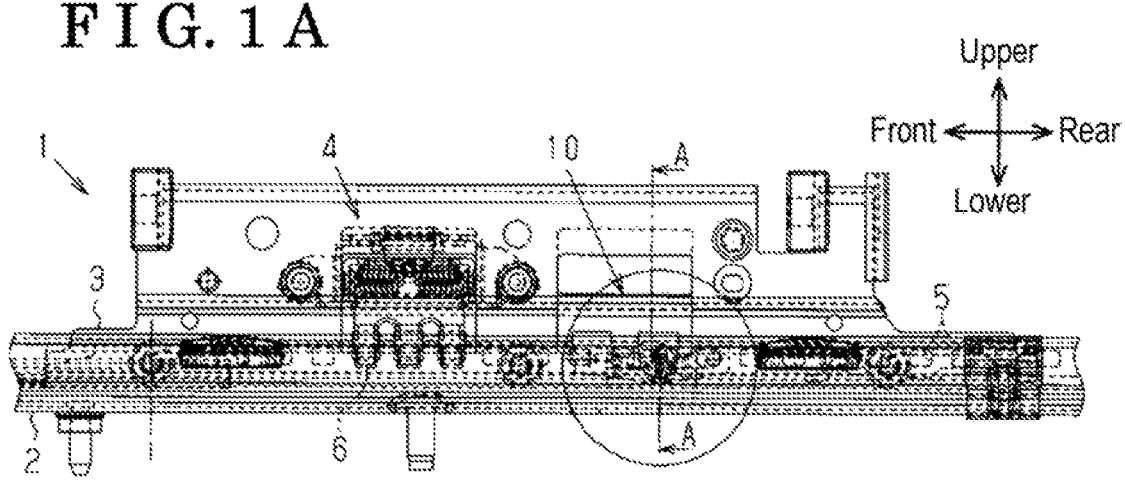
FIG. 1A is an overall side view of a seat sliding apparatus of a first embodiment.
Figure 1B:
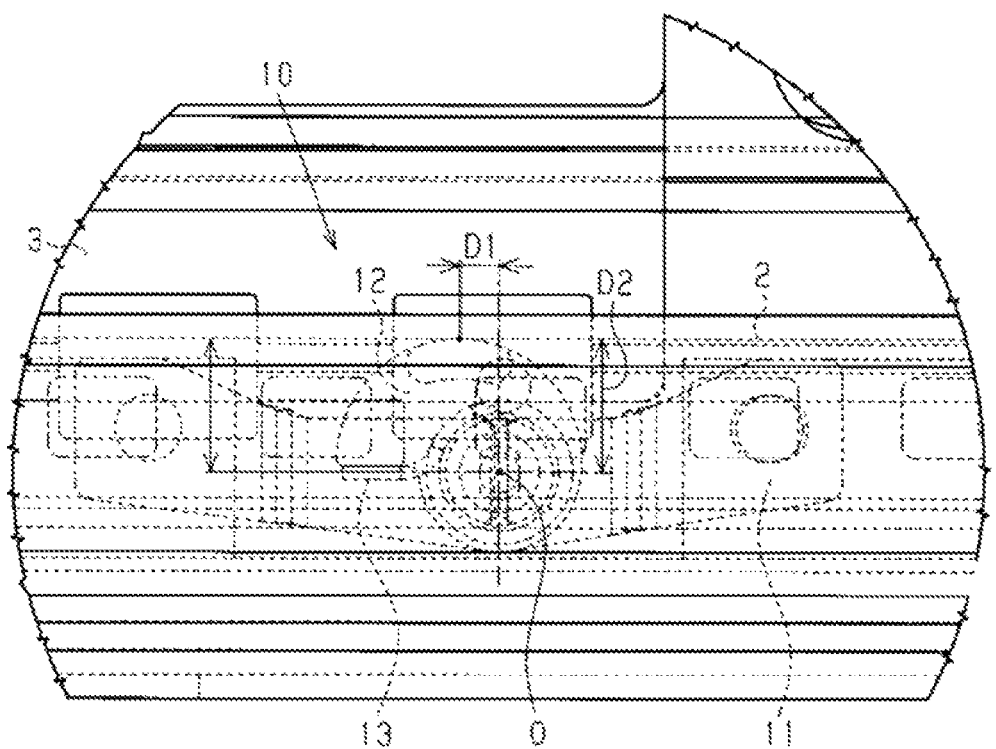
FIG. 1B is an enlarged view of a portion of FIG. 1A, the portion which is circled.
Figure 2A:
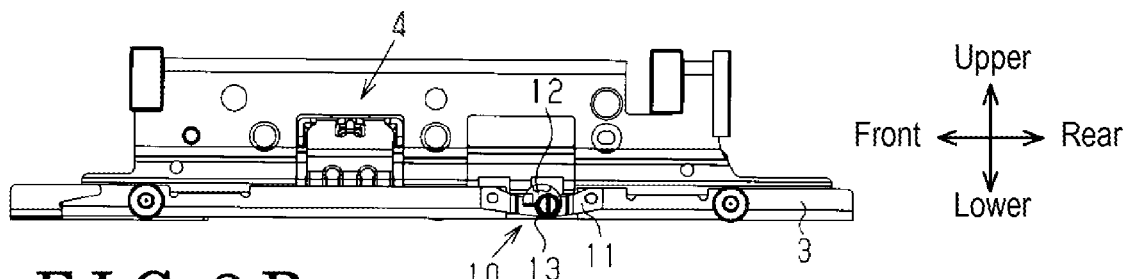
FIG. 2A is a side view of a sliding load adjustment mechanism of the first embodiment.
Figure 2B:
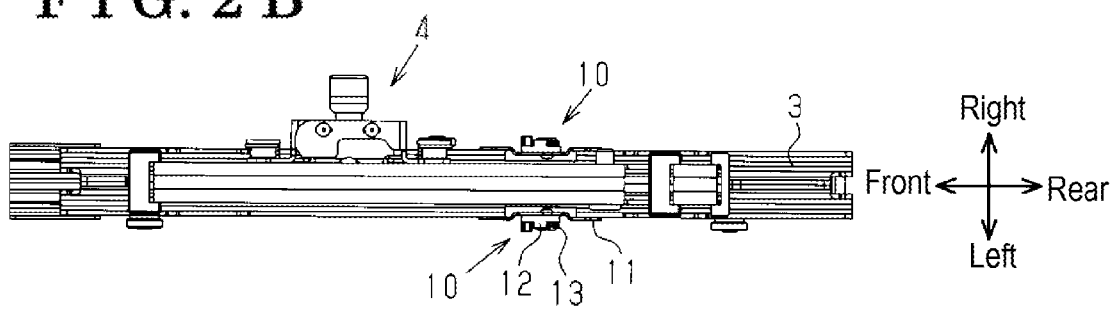
FIG. 2B is a top view of a top view of the sliding load adjustment mechanism of the first embodiment.
Figure 3:
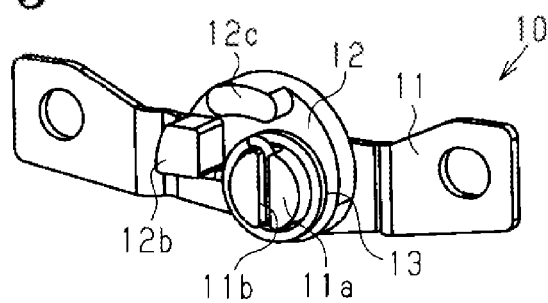
FIG. 3 is a perspective view of the sliding load adjustment mechanism of the first embodiment.

(Sliding load adjustment mechanism) As illustrated in each of FIGS. 1A, 1B, 2A, 2B and 3, the seat sliding apparatus 1 for a vehicle includes a sliding load adjustment mechanism 10. The sliding load adjustment mechanism 10 is provided at each of right and left sides of the single upper rail 3. The sliding load adjustment mechanism 10 attached to the left side of the upper rail 3 and the sliding load adjustment mechanism 10 attached to the right side of the upper rail 3 are configured to be left-right symmetric to each other. Here, the explanation will be made on the sliding load adjustment mechanism 10 attached to the left side of the upper rail 3 as a representative example.

The sliding load adjustment mechanism 10 includes a fixing member 11, a rotational member 12 serving as a pressing member, and a spiral spring 13 serving as a biasing member. The fixing member 11 is a plate member extended in a front and rear direction, and is fixed to a left side surface of the upper rail 3. The fixing member 11 includes a column portion 11a protruding from a central portion of the left side surface of the fixing member 11 towards the left side. In addition, the fixing member 11 includes a support portion 11b formed at a distal end portion of the column portion 11a and supporting one end portion of the spiral spring 13.

Figure 4:
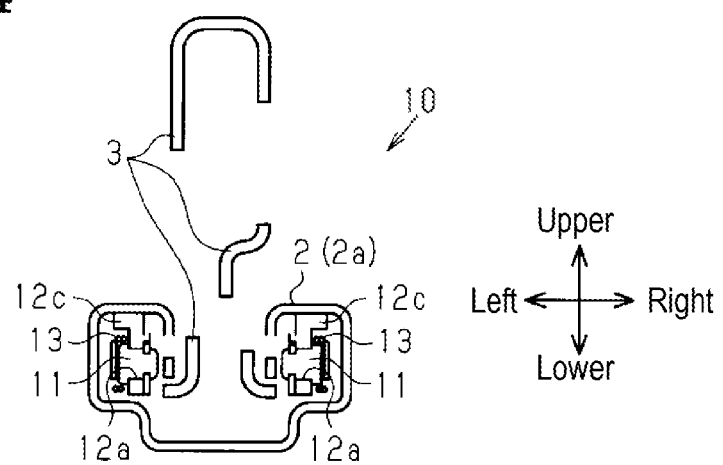
FIG. 4 is an end view of the sliding load adjustment mechanism of the first embodiment.

As illustrated in FIG. 4, the rotational member 12 is a plate member including a sector shape. The rotational member 12 includes an attachment hole 12a positioned rearward relative to a center of the sector and including an internal diameter which is slightly larger than the column portion 11a. The column portion 11a is inserted in the attachment hole 12a, and thus the rotational member 12 is attached to the fixing member 11 to be rotatable relative to the fixing member 11. A center of the attachment hole 12a is a rotational center O.

The rotational member 12 includes a support portion 12b positioned forward relative to the center of the sector and protruding towards the left side. The support portion 12b supports an end portion of the spiral spring 13, the end portion which is at a side opposite to the end portion supported by the support portion 11b. A distance between the rotational center O and a central portion of the support portion 12b is a length L.

The rotational member 12 includes a pressing portion 12c positioned at an upper side relative to the center of the sector and protruding towards the left side. An upper surface of the pressing portion 12c continues to an outer circumference of the rotational member 12. A position of the pressing portion 12c is set such that a distance between the pressing portion 12c and the rotational center O is longer than a distance in a vertical direction between a bottom surface of an upper wall portion 2a of the lower rail 2 and the rotational center O.

The spiral spring 13 includes an inner diameter that is slightly larger than an outer diameter of the column portion 11a. The spring spiral 13 is positioned further at the left side relative to the rotational member 12, and one end portion of the spiral spring 13 is fixed to the support portion 11b of the fixing member 11 and the other end portion of the spiral spring 13 is fixed to the support portion 12b of the rotational member 12 in a state where the spiral spring 13 is elastically compressed.

As the spiral spring 13 is attached to the fixing member 11, the spiral spring 13 is restricted from falling off towards the left side of the rotational member 12. The rotational member 12 is biased in the clockwise direction by the spiral spring 13. Precisely, the support portion 12b is biased upward by the spiral spring 13 with a biasing force Q. Here, the biasing force Q biasing the support portion 12b is a resultant force of forces acting on a portion at which the end portion of the spiral spring 13 and the support portion 12b are in contact with each other. Accordingly, for the purpose of convenience, in this example, the explanation will be made hereunder supposing that the biasing force Q acts on a point (biasing point F) at which the distance from the rotational center O is L, as illustrated n FIG. 5.

Because the distance between the pressing portion 12c and the rotational center O is set to be longer than the distance between the distance between the bottom surface of the upper wall portion 2a of the lower rail 2 and the rotational center O, the pressing portion 12c is in contact with the bottom surface of the upper wall portion 2a of the lower rail 2. Accordingly, the rotational member 12 is restricted from rotating in the clockwise direction. Here, a contact point at which the pressing portion 12c and the bottom surface of the upper wall portion 2a of the lower rail 2 is a contact point C. Because the distance between the pressing portion 12c and the rotational center O is set to be longer than the distance between the bottom surface of the upper wall portion 2a of the lower rail 2 and the rotational center O, the contact point C is positioned forward relative to the rotational center O. A distance in the front and rear direction between the contact point C and the rotational center O is a length D1, and a distance in an upper and lower direction between the contact point C and the rotational center O is a length D2.

The rotational member 12 is always in contact with the lower rail 2 at the contact point C. Accordingly, in a case where the upper rail 3 displaces or moves relative to the lower rail 2, the rotational member 12 functions as so-called shoe brake which obtains a braking force due to friction.

Figure 5:
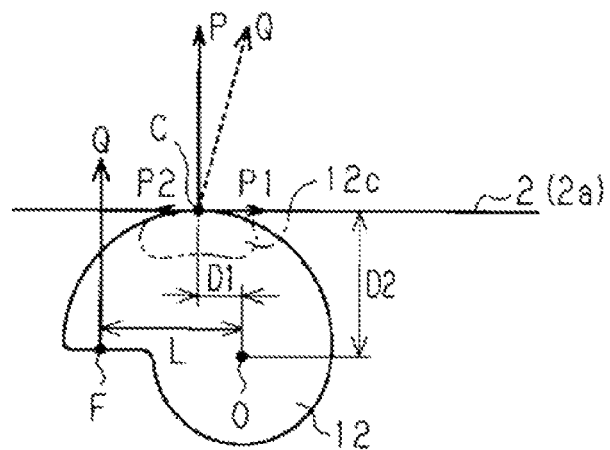
FIG. 5 is a schematic view illustrating forces acting on a rotational member of the first embodiment.

(Action of sliding load adjustment mechanism) Next, action of the sliding load adjustment mechanism 10 will be explained. As illustrated in FIG. 5, the contact point C is positioned forward relative to the rotational center O by the length D1 and is positioned upward relative to the rotational center O by the length D2. Accordingly, the biasing force Q acts obliquely relative to the lower rail 2, and thus, at the contact point C, the biasing force Q is resolved into a vertical component of the lower rail 2 and a backward component which is along the lower rail 2. Where the vertical component of the lower rail 2 corresponds to P, a vector towards a front side is positive, and a frictional coefficient corresponds to μ, the following (Expression 1) is established on the basis of balance of rotational moment at the contact point C.

$$QL = P(D1 \pm \mu D2) \quad \text{(Expression 1)}$$

In addition, torque T of the rotational member 12 is expressed in the product of a force and a distance, and thus the following (Expression 2) is established.

$$T = QL \quad \text{(Expression 2)}$$

Consequently, the following (Expression 3) is established from (Expression 1) and (Expression 2).

$$P = T/(D1 \pm \mu D2) \quad \text{(Expression 3)}$$

In accordance with (Expression 3), the sliding load adjustment mechanism 10 provides a load (frictional force) P1 expressed by (Expression 4) to the lower rail 2 in a case where the upper rail 3 is moved forward, and the sliding load adjustment mechanism 10 provides a load (frictional force) P2 expressed by (Expression 5) to the lower rail 2 in a case where the upper rail 3 is moved rearward.

$$P1 = T/(D1 - D2) \quad \text{(Expression 4)}$$

$$P1 = T/(D1 + D2\mu) \quad \text{(Expression 5)}$$

Because each of the lengths D1 and D2 is given as a positive value, the following (Expression 6) is established.

$$P1 > P2 \quad \text{(Expression 6)}$$

That is, the seat sliding apparatus 1 provides a larger load (frictional force) to the lower rail 2 in a case where the upper rail 3 is moved forward than in a case where the upper rail 3 is moved rearwards, and accordingly a user of the vehicle can slide the seat rearward more easily than rearward.

In a case where the above-described seat slide apparatus 1 is applied to a seat at which the front portion of the lower rail 2 is configured to be lower than the rear portion of the lower rail 2, a difference between the load (frictional force) P1 and the load (frictional force) P2 at the contact position C, and an inclination direction (downward direction) of the lower rail 2 forms a reverse relationship. Accordingly, the difference between the loads (frictional forces) P1 and P2 in the front and rear direction of the upper rail 3 which are along an extending direction of the lower rail 2, and a component of a gravity force acting on the seat (the upper rail 3) which is in the extending direction of the lower rail 2 are cancelled out each other or offset each other. Consequently, a difference between a load for operating the seat in a front direction which is required in a case where a seat position is adjusted in the front direction and a load for operating the seat in a rear direction which is required in a case where the seat position is adjusted in the rear direction can be reduced.

On the basis of (Expression 4) and (Expression 5), by setting the length D1 smaller and the length D2 larger, the difference between the loads P1 and P2 which are imposed on the lower rail 2 by the seat sliding apparatus 1 increases. By setting the inclination of the lower rail 2 in consideration of this, the difference between the load for operating the seat forward and the load for operating the seat rearward can be made close to 0 (zero) infinitely or illimitably.

As described above, according to the present embodiment, the following advantages are obtained. (1) The rotational member 12 always presses or pushes the bottom surface of the upper wall portion 2a of the lower rail 2 due to the biasing force Q of the spiral spring 13. By setting the distance between the pressing portion 12c and the rotational center O longer than the distance between the bottom surface of the upper wall portion 2a of the lower rail 2 and the rotational center O, the point of contact (contact point C) of the pressing portion 12c and the bottom surface of the upper wall portion 2a of the lower rail 2 with each other is positioned at the front side relative to the rotational center O. A pressing direction of the rotational member 12 is oblique or tilted relative to the lower rail 2. Thus, as expressed in the above-described (Expression 1) to (Expression 6), the seat sliding apparatus 1 imposes or applies the load (frictional force) P1 to the lower rail 2 when moving the upper rail 3 towards the front side, the load P1 which is larger than the load (frictional force) P2 that the seat sliding apparatus 1 imposes to the lower rail 2 when moving the upper rail 3 towards the rear side. Accordingly, the user of the vehicle can slide the seat rearward more easily than to slide the seat forward. In addition, the rotational member 12 and the lower rail 2 are always kept being in contact with each other and the load required for adjusting the seat position is stabilized, and thus the seat position is easily adjusted.

(2) In a case where the seat sliding apparatus 1 is applied to the seat at which the front portion of the lower rail 2 is configured to be lower than the rear portion of the lower rail 2, the difference between the loads (frictional forces) P1 and P1 which are in the front and rear direction is offset by the component of the gravity force. Consequently, the difference between the load for operating the seat in the front direction which is needed in a case where the seat position is adjusted towards the front side and the load for operating the seat in the rear direction which is needed in a case where the seat position is adjusted towards the rear side can be reduced.

(3) The column portion 11a is inserted in the rotational member 12 and in the spiral spring 13, and thus the rotational member 12 and the spiral spring 13 are attached to the upper rail 3. Because the rotational member 12 and the spiral spring 13 use the column portion 11a, which is an axial center commonly used by the rotational member 12 and the spiral spring 13, downsizing is made compared to a case other configuration is employed.

The aforementioned embodiment may be modified as follows. In the aforementioned embodiment, the seat sliding apparatus uses the spiral spring 13 as the biasing member and uses the rotational member 12 as the pressing member, however, the following configuration is also applicable.

Figure 6:
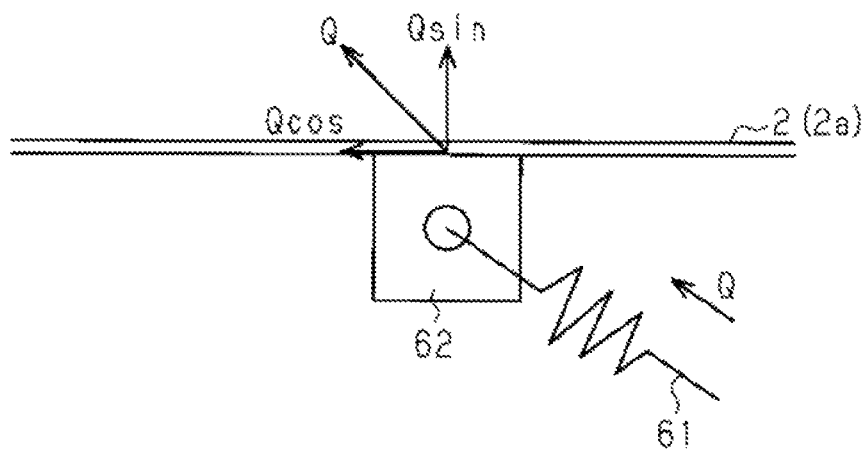
FIG. 6 is a view illustrating another example of the sliding load adjustment mechanism.

That is, as illustrated in FIG. 6, the seat sliding apparatus includes a coil spring 61 and a pressing portion 62 which serve as the biasing member and the pressing member, respectively. The pressing portion 62 does not rotate. One end portion of the coil spring 61, which is not shown, is fixed to the upper rail 3 and the other end portion is fixed to the pressing portion 62. The pressing portion 62 always pushes or presses the lower rail 2 such that the biasing force Q of the coil spring 61 acts obliquely relative to the lower rail 2. Accordingly, the biasing force Q is resolved into Q sin which is a vertical component of the lower rail 2 and into Q cos which is a component in an extending direction. In such a configuration, the advantages described in the above (1) and (2) of the aforementioned embodiment can be obtained.

Figure 7:
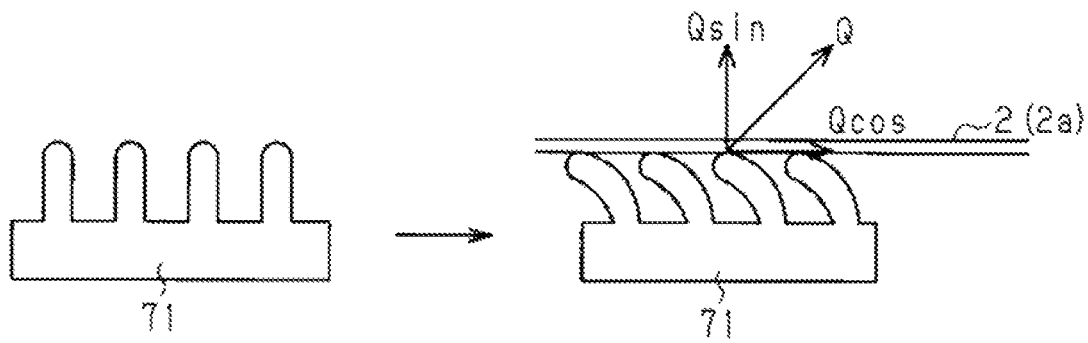
FIG. 7 is a view illustrating another example of the sliding load adjustment mechanism.
Figure 11:
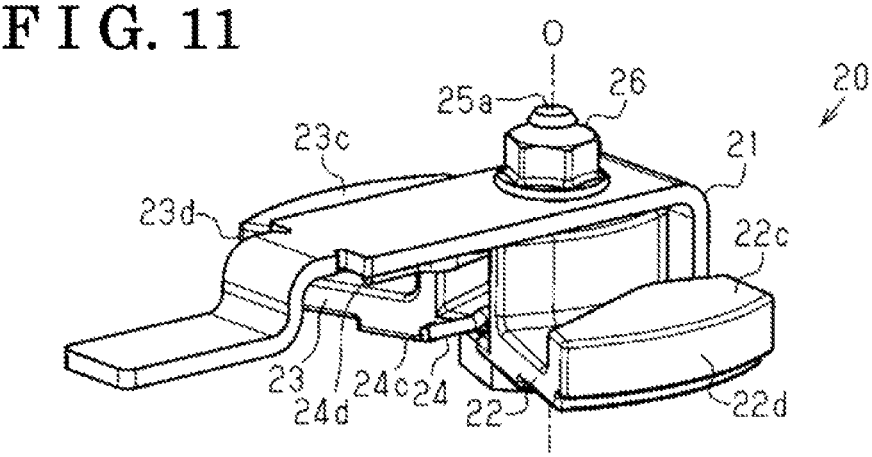
FIG. 11 is a perspective view of a sliding load adjustment mechanism of the second embodiment.
Figure 12:
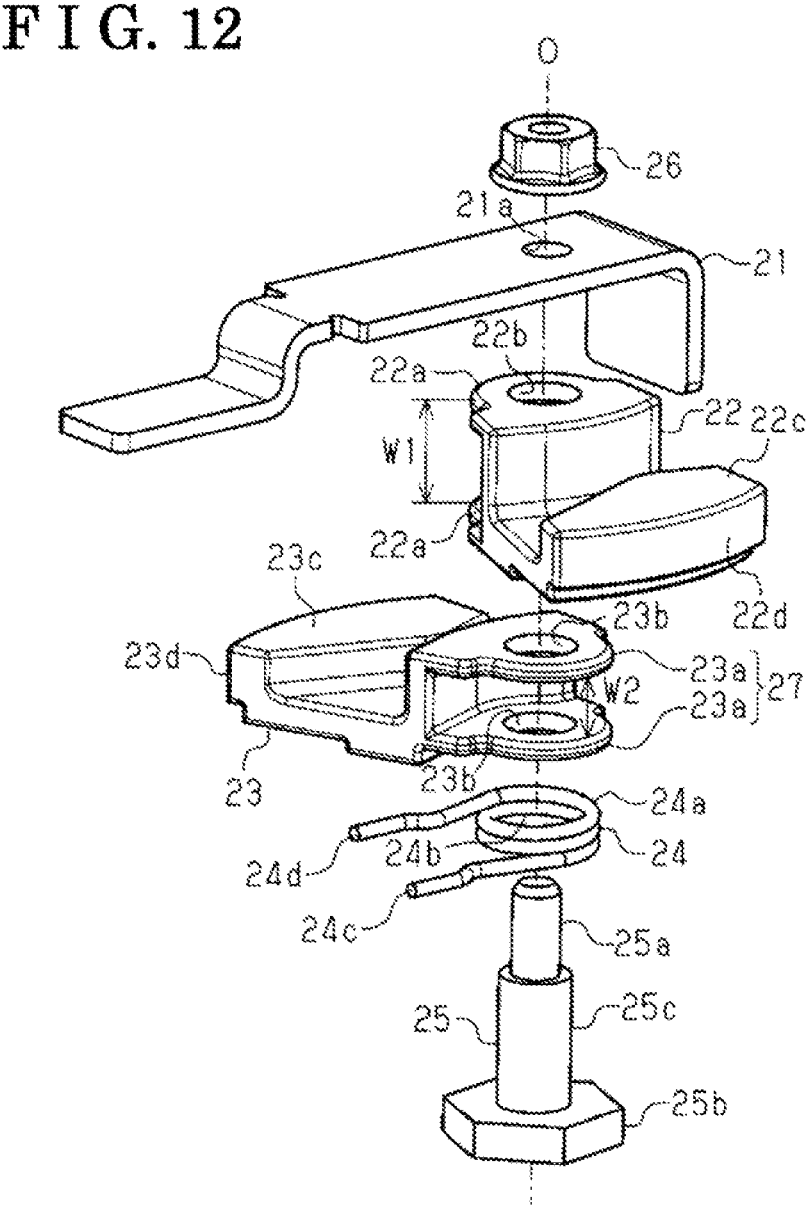
FIG. 12 is an exploded perspective view of the sliding load adjustment mechanism of the second embodiment.

As illustrated in FIG. 7, the seat sliding apparatus may include a member 71 including functions of both the biasing member and the pressing member. Also in a case where the configuration is applied which functions as both the biasing member and the pressing member by being elastically compressed, the biasing force Q is resolved into Q sin corresponding to the vertical component of the lower rail 2 and Q cos corresponding to the component in the extending direction of the lower rail 2. Consequently, the advantages described in the above (1) and (2) of the aforementioned embodiment can be obtained.

In the aforementioned embodiment, in a case where the seat slide apparatus 1 is applied to the seat at which the rear portion of the lower rail 2 is configured to be lower than the front portion of the lower rail 2, the difference between the loads (frictional forces) P1 and P1 in the front and rear direction can be offset with the component of the gravity force. Instead of this, by using the seat sliding apparatus 1 for the lower rail 2 which is horizontal, the difference of the loads can be made between a case where the seat position is adjusted towards the front side and a case where the seat position is adjusted towards the rear side. Consequently, the seat sliding apparatus which is intentionally difficult to be displaced or moved towards the front side can be provided.

In the aforementioned embodiment, the sliding load adjustment mechanisms 10 are provided at both right and left sides of the upper rail 3, however, the sliding load adjustment mechanism 10 may be provided only at one side. In the aforementioned embodiment, one sliding load adjustment mechanism 10 is provided at each of the right and left sides of the upper rail 3, however, two or more sliding load adjustment mechanisms 10 may be provided at each of the right and left sides.

In the aforementioned embodiment, the rotational member 12 is in contact with the upper wall portion 2a of the lower rail 2, however, the rotational member 12 may be in contact with a portion of the lower rail 2, the portion which is other than the upper wall portion 2a. (Second embodiment) Next, a second embodiment of the seat sliding apparatus for a vehicle will be described hereunder with reference to the drawings. Main difference between the present embodiment and the aforementioned first embodiment is only a mode of the sliding load adjustment mechanism. Thus, for the purpose of convenience of explanation, the same reference numerals as in the first embodiment designate the same configurations and explanations thereof are omitted.

(Sliding load adjustment mechanism) As illustrated in FIGS. 8A, 8B and 9, the seat sliding apparatus 1 for a vehicle according to the present embodiment includes a sliding load adjustment mechanism 20. The sliding load adjustment mechanism 20 is provided at each upper rail 3.

As illustrated in FIGS. 9 to 12, the sliding load adjustment mechanism 20 includes a fixing member 21, two rotational members 22, 23 serving as the pressing member, a spiral spring (torsion spring) 24 serving as the biasing member, a pin 25 serving as a support member, and a nut 26.

The fixing member 21 is a plate member extended in the front and rear direction and is fixed to a portion of the upper rail 3, the portion which is made by cutting away a part of a lower portion of the upper rail 3. The fixing member 21 is provided with an attachment hole 21a in which a threaded portion 25a at a distal end of the pin 25 is inserted. The attachment hole 21a is positioned at a center of the upper rail 3 in a right-and-left direction of the upper rail 3.

Each of the two rotational members, that is, first and second rotational members 22 and 23, is a member including a sector shape. When viewed from a rear side to a front side, the first rotational member 22 is arranged to protrude towards the left side while the pin 25 serving as a center. The second rotational member 23 is arranged to protrude towards the right side in a similar circumstance. The first second rotational member 22 includes attachment pieces 22a arranged as a pair in the upper and lower direction. The second rotational member 23 includes attachment pieces 23a arranged as a pair in the upper and lower direction. Each of the attachment pieces 22a includes an attachment hole 22b into which the pin 25 is inserted and each of the attachment pieces 23a includes an attachment hole 23b into which the pin 25 is inserted. A support shaft portion 25c, which is between the threaded portion 25a of the pin 25 and the head portion 25b of the pin 25, is positioned at each of the attachment holes 22b and 23b.

A distance W2 between the attachment pieces 23a, which are provided as the pair, of the second rotational member 23 is set to be larger than a thickness of the spiral spring 24 in the upper and lower direction. The spiral spring 24 is accommodated in an accommodation portion 27 formed between the attachment pieces 23a provided as the pair. A distance W1 between the attachment pieces 22a, which are provided as the pair, of the first rotational member 22 is set to be larger than the distance W2 between the attachment pieces 23a, which are provided as the pair, of the second rotational member 23. That is, the pair of attachment pieces 22a of the first rotational member 22 and the pair of attachment pieces 23a of the second rotational member 23 are overlapped and assembled to each other in such a manner that the attachment pieces 22a are arranged at an outer side in the upper and lower direction relative to the attachment pieces 23a.

In a state where the attachment pieces 22a and 23a are combined with each other and the spiral spring 24 is accommodated in the accommodation portion 27, the pin 25 is inserted into the attachment holes 22b and 23b of the respective attachment pieces 22a and 23a and into an attachment hole 24b of a wound portion 24a of the spiral spring 24. Thereafter, the threaded portion 25a of the pin 25 is inserted into the attachment hole 21a of the fixing member 21, and the nut 26 is screwed after the insertion. In this manner, the first and second rotational members 22 and 23, and the spiral spring 24 are attached between the fixing member 21 and the head portion 25b of the pin 25, and each of the rotational members 22 and 23 becomes rotatable about the pin 25 (the support shaft portion 25c) in a horizontal direction. That is, a center of the pin 25 corresponds to the rotational center O of each of the rotational members 22 and 23.

End portions 24c and 24d extend from one end and the other end of the wound portion 24a of the spiral spring 24, respectively. The end portions 24c and 24d are locked and retained at the first and second rotational members 22 and 23, and provide a biasing force in a direction in which the rotational members 22 and 23 are made to spread or open (a direction in which the rotational members 22 and 23 rotate from the front side towards the rear side of the upper rail 3) while the pin 25 serving as the center.

The first and second rotational members 22 and 23 include pressing portions 22c and 23c, respectively. The pressing portions 22c and 23c are joined to the attachment pieces 22a and 23a, and extend towards the protruding sides, respectively. End surfaces 22d and 23d of a radially outer side of the pressing portions 22c and 23c are formed in arc shapes. The end surfaces 22d and 23d include a line symmetric configuration with respect to a straight line in the front and rear direction of the upper rail 3, the straight line which passes the rotational center O of the rotational members 22 and 23 (the center of the pin 25).

A distance from the rotational center O of the rotational members 22 and 23 (the center of the pin 25) to the end surfaces 22d and 23d of the pressing portions 22c and 23c differs depending on a position in the front-and-rear direction. That is, the arc shapes of the end surfaces 22d and 23d are set to be offset towards the front side of the upper rail 3 relative to the rotational center O. Therefore, as illustrated in FIG. 8A, a distance A from the rotational center O to a front end portion of each of the end surfaces 22d and 23d is larger than a distance B from the rotational center O to a rear end portion of each of the end surfaces 22d and 23d. That is, it is set such that the distance from the rotational center O to the end surfaces 22d and 23d increases from the rear side towards the front side from the rear side.

The end surfaces 22d and 23d of the pressing portions 22c and 23c are in contact with an inner side surface of a side wall portion 2b of the lower rail 2. At this time, the contact points C at which the respective end surfaces 22d and 23d of the pressing portions 22c and 23c are in contact with the inner side surface of the side wall portion 2b of the lower rail 2 are set to be positioned forward relative to the rotational center O of the rotational members 22 and 23. At the contact points C, the respective end surfaces 22d and 23d of the pressing portions 22c and 23c of the rotational members 22 and 23 are always in oblique contact with the inner side surface of the side wall portion 2b of the lower rail 2, and accordingly a braking force (shoe brake) that is similar to the first embodiment is obtained.

(Action of sliding load adjustment mechanism) Next, action of the sliding load adjustment mechanism 20 will be explained. At the sliding load adjustment mechanism 20 of the present embodiment, the contact positions of the rotational members 22 and 23 are the side wall portion 2b of the lower rail 2, however, principle of the action is similar to the sliding load adjustment mechanism 10 of the first embodiment.

That is, in a case where the upper rail 3 moves rearward relative to the lower rail 2, when each of the rotational members 22 and 23 receives the frictional force which is equal to or greater than the biasing force of the spiral spring 24, each of the rotational members 22 and 23 rotates slightly in a direction in which the rotational members 22 and 23 are folded against the biasing force (each of the rotational members 22 and 23 rotates slightly from the rear side towards the front side). Consequently, the load acting on the upper rail 3 is small. On the other hand, in a case where the upper rail 3 moves forward relative to the lower rail 2, when each of the rotational members 22 and 23 receives the frictional force, each of the rotational members 22 and 23 rotates slightly in the direction in which the rotational members 22 and 23 are spread or opened (rotates slightly from the front side towards the rear side). Consequently, the load acting on the upper rail 3 is large.

In consequence, the seat sliding apparatus 1 applies a larger load (frictional force) to the lower rail 2 with the use of the sliding load adjustment mechanism 20 when moving the upper rail 3 forward than when moving the upper rail 3 rearward. Therefore, it is easier for the user of the vehicle to slide the seat rearward than forward.

In a case where the above-described seat sliding apparatus 1 is applied to the seat at which the front portion of the lower rail 2 is configured to be lower than the rear portion of the lower rail 2, the difference between the loads (frictional forces) in the front and rear direction of the upper rail 3 which are along the extending direction of the lower rail 2, and the component of the gravity force acting on the seat (the upper rail 3) which is in the extending direction of the lower rail 2 are cancelled out each other or offset each other. Consequently, the difference between the load for operating the seat towards the front side and the load for operating the seat towards the rear side can be reduced.

In the present embodiment, in a similar manner to the first embodiment, the pressing portions 22c and 23c of the first and second rotational members 22 and 23 are respectively positioned at both sides in the right-and-left direction of the lower rail 2 to be positioned at an equal distance from the center (in this case, the rotational center O) of the lower rail 2 in the right-and-left direction, and the pressing portions 22c and 23c press the lower rail 2. Accordingly, the pressing positions pressed or pushed by the sliding load adjustment mechanism 20 increase and the sliding load adjustment mechanism 20 is allowed to apply the pressing force to the lower rail 2 in a well-balanced manner. In addition, for the two rotational members 22 and 23, the configuration includes one each of the fixing member 21, the pin 25 and the spiral spring 24, thereby achieving the reduction in the number of components. Further, the spiral spring 24 is accommodated in the accommodation portion 27, thereby minimizing exposure of the spring 24.

The configuration of the sliding load adjustment mechanism 20 may be modified appropriately. The modified examples of the sliding load adjustment mechanism 10 of the first embodiment, the modified examples which are described immediately before the second embodiment, may be appropriately combined with the sliding load adjustment mechanism 20 of the second embodiment.

The invention claimed is:

1. A seat sliding apparatus for a vehicle, the apparatus comprising:
    a lower rail;
    an upper rail supported to be movable relative to the lower rail; and
    a pressing member attached to one of the lower rail and the upper rail via a biasing member, the pressing member always pressing the other of the lower rail and the upper rail with the use of a biasing force of the biasing member, wherein:
    the lower rail and the upper rail are extended in a first direction; and
    the pressing member presses the other of the lower rail and the upper rail obliquely such that component forces are generated both in the first direction and a second direction that is orthogonal to the first direction;
    the biasing member corresponds to a spiral spring;
    the pressing member corresponds to a rotational member rotated by the biasing force of the spiral spring;
    the spiral spring and the rotational member are attached to one of the lower rail and the upper rail in a state where axial centers coincide with each other;
    the lower rail is inclined in such a manner that one of a front portion and a rear portion of the lower rail is higher than the other; and
    the pressing member is attached to the upper rail and presses the lower rail such that a component force along a downward direction of the lower rail is generated.

2. The seat sliding apparatus for a vehicle according to claim 1, wherein
    the pressing member is provided as a pair,
    the pressing members are positioned at respective sides in a right-and-left direction of the lower rail and the upper rail to be positioned at an equal distance from a center in the right-and-left direction; and
    the pressing members press the lower rail or the upper rail.

3. The seat sliding apparatus for a vehicle according to claim 2, the apparatus further comprising:
    a fixing member for attaching the pair of pressing members to one of the lower rail and the upper rail; and
    a support member supporting the pressing members in such a manner that the pressing members are rotatable, wherein
    the pair of pressing members are configured to use, in common, the single fixing member, the single support member and the single biasing member.

4. The seat sliding apparatus for a vehicle according to claim 1, wherein the pressing member includes an accommodation portion accommodating the biasing member.

* * * * *